United States Patent
Xue et al.

(10) Patent No.: US 6,324,914 B1
(45) Date of Patent: Dec. 4, 2001

(54) PRESSURE SENSOR SUPPORT BASE WITH CAVITY

(75) Inventors: Liang A. Xue, Randolph, NJ (US); Anthony J. Bernot, Gilbert, AZ (US)

(73) Assignee: AlliedSignal, Inc., Morris Township, NJ (US)

( * ) Notice: Subject to any disclaimer, the term of this patent is extended or adjusted under 35 U.S.C. 154(b) by 0 days.

(21) Appl. No.: 09/353,569

(22) Filed: Jul. 15, 1999

Related U.S. Application Data

(63) Continuation-in-part of application No. 08/986,253, filed on Dec. 5, 1997, now Pat. No. 6,058,780.
(60) Provisional application No. 60/040,824, filed on Mar. 20, 1997.

(51) Int. Cl.$^7$ ................................................ G01L 9/12
(52) U.S. Cl. ................................................ 73/718
(58) Field of Search ............................ 361/283.1, 283.2, 361/283.3, 283.4; 73/718, 724

(56) References Cited

U.S. PATENT DOCUMENTS

| | | |
|---|---|---|
| 3,232,114 | 2/1966 | Ferran . |
| 3,697,835 | 10/1972 | Satori . |
| 3,962,921 | 6/1976 | Lips . |
| 3,965,746 | 6/1976 | Rabek . |
| 4,101,952 | 7/1978 | Burn . |
| 4,184,189 | 1/1980 | Davis et al. . |
| 4,221,047 | 9/1980 | Narken et al. . |
| 4,388,668 | 6/1983 | Bell et al. . |
| 4,396,721 | 8/1983 | Lawless . |
| 4,405,970 | 9/1983 | Swindal et al. . |
| 4,422,335 | 12/1983 | Ohnesorge et al. . |
| 4,426,673 | 1/1984 | Bell et al. . |
| 4,609,966 | 9/1986 | Kuisma . |
| 4,831,492 | 5/1989 | Kuisma . |
| 4,876,892 | 10/1989 | Arabia et al. . |
| 4,926,696 | 5/1990 | Haritonidis et al. . |
| 4,998,179 | 3/1991 | Grantham et al. . |
| 5,005,421 | 4/1991 | Hegner et al. . |
| 5,049,421 | 9/1991 | Kosh . |
| 5,050,035 | 9/1991 | Hegner et al. . |
| 5,189,591 | 2/1993 | Bernot . |

(List continued on next page.)

FOREIGN PATENT DOCUMENTS

| | | |
|---|---|---|
| 0 473 109 | 3/1999 | (EP) . |
| 0 473 109 A3 | 3/1999 | (EP) . |
| WO 98/41830 | 9/1998 | (WO) ............................ G01L/9/00 |

OTHER PUBLICATIONS

PCT International Search Report dated Dec. 18, 2000.
Patent Abstracts of Japan Publication No. 01284726, Publication Date Nov. 16, 1989 Applicant Toyota Autom Loom Works Ltd., Inventor Shimazaki Kazunori.
Patent Abstracts of Japan Publication No. 01284727, Publication Date Nov. 16, 1989 Applicant Toyota Autom Loom Works Ltd., Inventor Miwa Makoto.
"A Glass–Based Capacitive Transducer," Apr. 1996.

*Primary Examiner*—William Oen
(74) *Attorney, Agent, or Firm*—Keith Newburry, Esq.

(57) ABSTRACT

A capacitive pressure sensor capsule having a support base with a cavity is provided. The capsule includes a housing having a ceramic cover sealingly attached to a ceramic base to define an interior chamber. The base has a cavity facing this interior chamber and at least one hole adjacent the cavity that extends through the base. A glass sensor has a first diaphragm with a first electrode and a second diaphragm with a second electrode bonded together to form a capacitor and is mounted in the chamber so that one of the diaphragms is received within the cavity and the other diaphragm lies on the surface of the base and covers the hole. A conducting member extends from the sensor, through the hole to electronic circuitry mounted to the capsule. The cavity also has a land for supporting the diaphragm disposed therein.

16 Claims, 3 Drawing Sheets

U.S. PATENT DOCUMENTS

| | | |
|---|---|---|
| 5,189,916 | 3/1993 | Mizumoto et al. . |
| 5,211,058 | 5/1993 | Fukiura et al. . |
| 5,317,919 | 6/1994 | Awtrey . |
| 5,349,492 | 9/1994 | Kimura et al. . |
| 5,440,931 | 8/1995 | Wiegand et al. . |
| 5,446,616 | 8/1995 | Warren . |
| 5,485,345 | 1/1996 | Lukasiewicz et al. . |
| 5,486,976 | 1/1996 | Charboneau et al. . |
| 5,499,158 | 3/1996 | Bishop et al. . |
| 5,525,280 | 6/1996 | Shukla et al. . |
| 5,528,452 | 6/1996 | Ko . |
| 5,544,399 | 8/1996 | Bishop et al. . |
| 5,578,528 | 11/1996 | Wuu et al. . |
| 5,585,311 | 12/1996 | Ko . |
| 5,689,999 | 11/1997 | Wiley et al. . |
| 5,740,594 | 4/1998 | Lukasiewicz et al. . |
| 5,757,608 | 5/1998 | Bernot . |
| 5,776,276 | 7/1998 | Goebel et al. . |
| 5,801,313 | 9/1998 | Horibata et al. . |
| 5,954,850 | 9/1999 | Bernot et al. . |

PRESSURE SENSOR SUPPORT BASE WITH CAVITY

CROSS-REFERENCE TO RELATED APPLICATION

This application is a continuation-in-part of application Ser. No. 08/986,253, filed Dec. 5, 1997 now U.S. Pat. No. 6,058,780 and also claims benefit of Prov. No. 60/040,824 filed Mar. 20, 1997.

TECHNICAL FIELD

This invention relates generally to pressure sensors and transducers and in particular to glass-ceramic components of such sensors.

BACKGROUND OF THE INVENTION

Ohnesorge et al, U.S. Pat. No. 4,422,335 discloses a pressure transducer made using quartz plates and Bernot, U.S. Pat. No. 5,189,591 discloses a pressure transducer using alumino-silicate glass plates. Whether glass or quartz, these sensors have generally been mounted to headers made of aluminum or stainless steel. Besides being expensive to machine, another disadvantage to these aluminum and stainless steel headers is that it is difficult to hermetically seal the electrical connections to these sensors. Without a hermetic seal, liquid and gas contaminants in the sensing medium can enter and ruin the sensor. As a result these types of sensors can only be used where the pressure medium is contaminant free such as dry gasses.

A further advance in sensor technology is disclosed in Bernot et al, U.S. patent application Ser. No. 08/986,253, filed Dec. 5, 1997, entitled, (as amended), "Capacitive Pressure Sensor Housing Having a Ceramic Base" which is assigned to the assignee of this application. This application discloses a sensor in which the prior art aluminum or stainless steel headers, (also referred to as bases), are replaced with a ceramic header and a cover that is either ceramic or metallic. The cover and header are sealed together with glass frit to define an interior chamber. A capacitive pressure sensor with alumino-silicate glass plates is mounted within the chamber.

Referring to FIGS. 1–5, in the fabrication of low-cost pressure sensor a critical component is the sensor base or header 36 that supports the housing 24 and the sensor 10 which is frit bonded to the top surface of pillar 50. The base can be fabricated by a number low cost ceramic process which form the base from a glass powder. Because of the relatively small dimensions of the pillars 50, it is difficult with these processes to achieve the required surface flatness of the top surfaces of the pillars 50 without the additional steps machining and grinding the surface. These steps of course increase manufacturing cost and reduce yield. They also cause a wide variation in tolerance that reduces sensor accuracy.

Accordingly, there is a need for base or header design that eliminates the flatness problem associated with the pillars.

SUMMARY OF THE INVENTION

An object of the present invention is to a sensor that has a base or header design that eliminates the flatness problem associated with the pillars.

The present invention accomplishes this object by providing a capacitive pressure sensor with a cavity is provided. The capsule includes a housing having a ceramic cover sealingly attached to a ceramic base to define an interior chamber. The base has a cavity facing this interior chamber and at least one hole adjacent the cavity that extends through said base. A glass sensor comprising a first diaphragm with a first electrode thereon and a second diaphragm with a second electrode thereon bonded together to form a capacitor is mounted in the chamber so that one of the diaphragms is received within the cavity and the other diaphragm lies on the surface of said base and covers the hole. A conducting member extends from said sensor, through the hole to electronic circuitry mounted to the capsule. The cavity also has a land for supporting the diaphragm disposed in therein.

Because the area of the top surface of the base is much larger than the area of the top surface of the pillar, its flatness is no longer a concern and in making these bases the steps of machining and grinding are no longer necessary.

These and other objects, features and advantages of the present invention are specifically set forth in or will become apparent from the following detailed description of a preferred embodiment of the invention when read in conjunction with the accompanying drawings.

DESCRIPTION OF THE PREFERRED EMBODIMENT

Bernot, U.S. Pat. No. 5,189,591 which issued on Feb. 23, 1993 and is assigned to AlliedSignal Inc., is hereby incorporated by reference. This patent discloses a capacitive pressure transducer having aluminosilicate glass plates.

Figure 1:
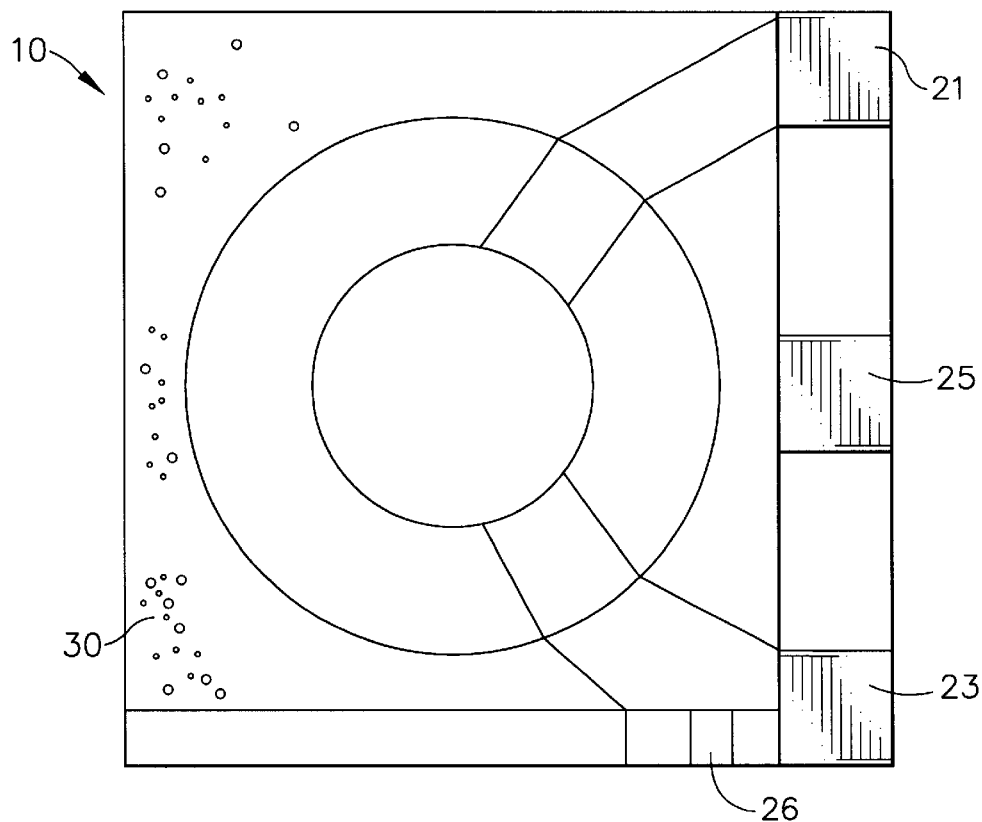
FIG. 1 is a top view of a glass pressure transducer.
Figure 2:
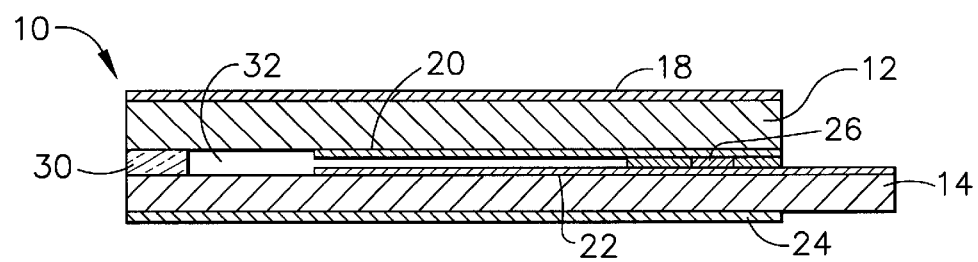
FIG. 2 is a side view of the pressure transducer of FIG. 1.

A glass pressure transducer 10 contemplated by the present invention is shown in FIGS. 1 and 2. The transducer or sensor 10 includes a top diaphragm 12 and a bottom diaphragm 14 which may be of different thickness made from a glass preferably aluminosilicate glass such CORNING #1723 or #1737F. Ground shields 18 and 24 are deposited on the outer surfaces of the diaphragms 12 and 14. Electrodes 20 and 22 are deposited in the inner surfaces of the diaphragms 12 and 14. A crossover metal tab 26 preferably made of silver acts as a conductor from the electrode 20 to a top electrode lead 21. Alternatively, the crossover tab 26 can be made from other metals such as platinum, palladium, or gold. The electrode 22 is connected to a bottom electrode lead 23. A ground lead 25 may also be added. The leads 21, 23, and 25 are preferably made of a noble metal, preferably platinum. Wires, not shown, may be connected to these leads. The geometry of the electrodes 20, and 22 can be round, square, or other shape. In addition the electrodes can be configured as multiple reference capacitor or pressure capacitors. The ground shields 18, 24 and the electrodes 20, 22 are made of a noble metal preferably platinum.

The diaphragms 12 and 14 are bonded together such that the electrodes 20 and 22 form a capacitor. The bond is formed by hydrate bonding, glass fritting, or other adhesives. The frit glass 30 acts as a spacer between the diaphragms 12 and 14 and also as a seal to form a cavity 32 between the diaphragms. The cavity 32 can be evacuated to form either a vacuum, some other reference pressure, or left open for gauge pressure measurement.

Figure 3:
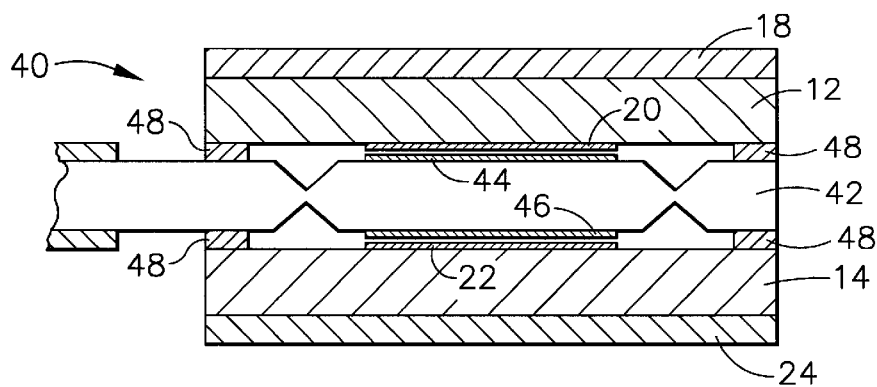
FIG. 3 is a side view of a glass accelerometer.

Referring to FIG. 3, a three piece glass accelerometer 40 can be formed from the pressure transducer 10 by mounting a glass, preferably aluminum silicate, seismic mass 42 between the top and bottom diaphragms 12,14. The seismic mass 42 has an electrode 44 in opposed relationship with electrode 20 and an electrode 46 in opposed relationship with electrode 22. The seismic mass 42 is bonded to the diaphragms 12,14 by frit 48 in such a way as to form cavity 49.

Figure 4:
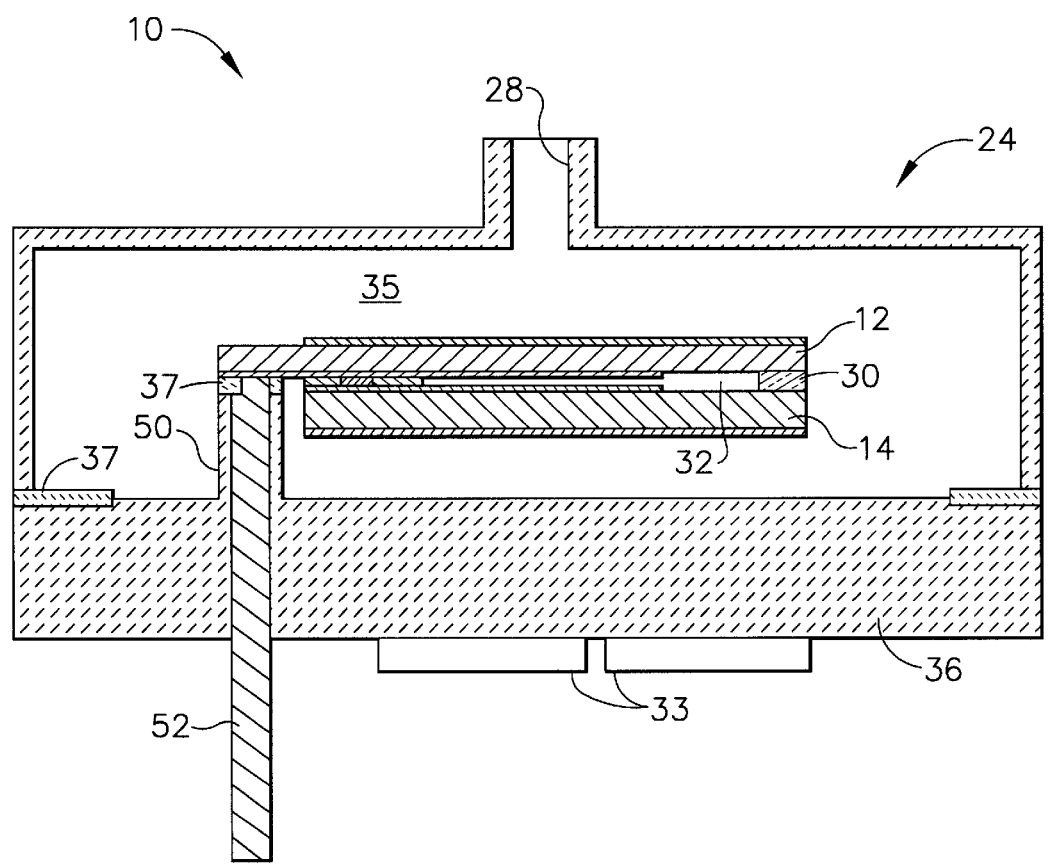
FIG. 4 is a schematic of the sensor of FIG. 1 mounted in a ceramic housing.
Figure 5:
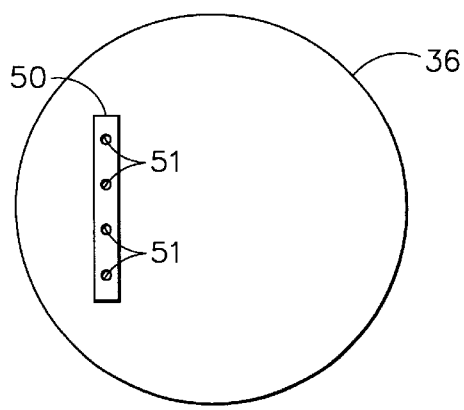
FIG. 5 is a top view of the base of the sensor of FIG. 4.

Referring to FIGS. 4 and 5, the sensor 10 is mounted within a two part glass ceramic housing having a cover 24 and a header or base 36 that define an interior chamber 35. Alternatively, the cover 24 can be made of metal or polymer. The cover 24 and base 36 can be sealed together with glass or ceramic frit 37 or an organic adhesive or a mechanical sealing method. The cover 24 has a pressure inlet port 28 that is in fluid communication with a source of fluid pressure to be measured and with the chamber 35. In a manner familiar to those skilled in the art, the base 36 is mounted to electronic circuitry 33. The base 36 has four holes 51 extending through the integral pillar 50 and into the chamber 35. The top diaphragm 12 is mounted to the top surface of the pillar 50 with glass or ceramic frit 37 or other adhesive. Metal conducting pins 52 or films, electrically connect top diaphragm 12 through the holes 51 to the optional electronic circuitry 33 on the base 36. The cover 24 and base 36 can have a variety of shapes such as square, rectangular or circular.

Figure 7:
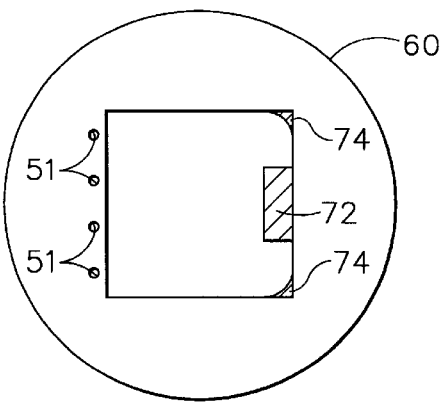
FIG. 7 is a top view of a second embodiment of the sensor base as contemplated by the present invention.
Figure 6:
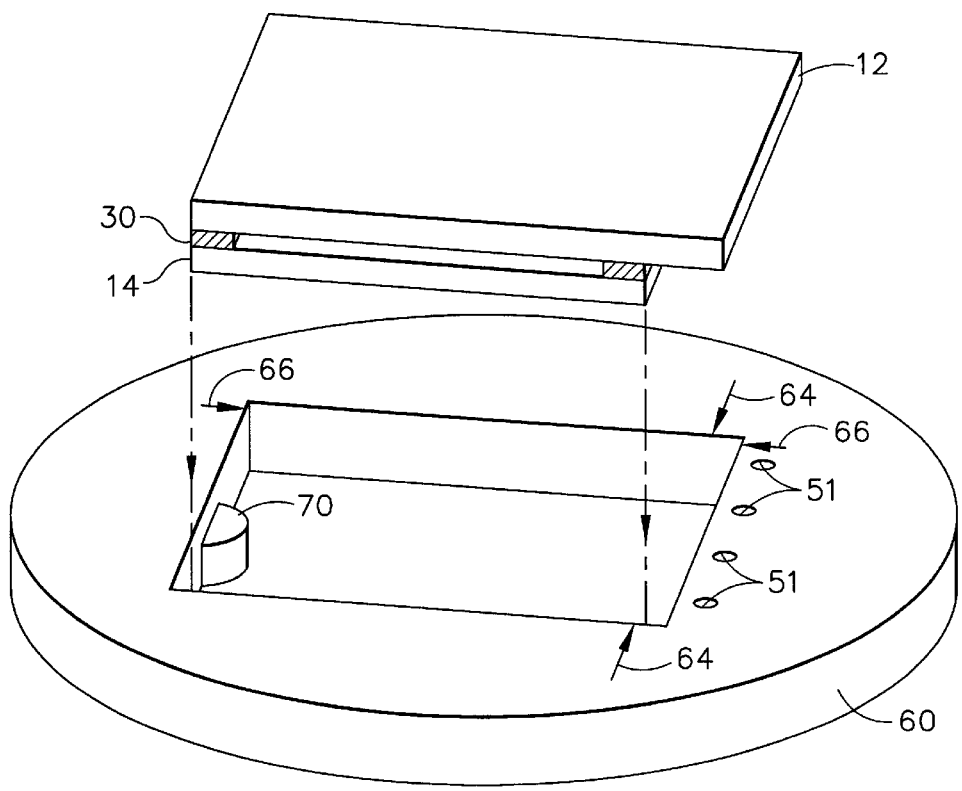
FIG. 6 is an exploded perspective view of one embodiment of a sensor base as contemplated by the present invention.

FIGS. 6 shows an improved base 60 that can be used in place of base 36 but which does not have the pillar 50. The base 60 is circular though it is contemplated that it could have a variety of shapes such as square or rectangular. Generally centered on the top surface of the base 60 is a recess or cavity 62. The recess is square, though like the base it may take on other shapes. Disposed along one edge of the recess and spaced apart therefrom are the holes 51. The cavity 62 has width represented by arrow 64 slightly larger than the width of the wider of the two diaphragms 12 and 14 and a length represented by arrows 66 slightly shorter than the longest of the two diaphragms 12 and 14. Thus the diaphragm 12 rest on the top flat surface of the base 60 surrounding the cavity 62, and a portion of the diaphragm 12 lies over the holes 51 so the electrical connection to the electronic circuitry 33 can be made. The diaphragm 12 is frit-bonded to the base in the same manner as previously described with respect to the pillar 50. The cavity 62 has a depth of about ¼ to ½ the height 68 of the base 60, with ⅓ the height preferred. Disposed within the cavity 62 is a land 70. The land 70 abuts the bottom and a side of the cavity 62, and has a height about ¾ the height of the cavity. The land 70 has a curved edge and is centrally located in the length direction. FIG. 7 shows an alternative embodiment having a land 72 centrally located in the length direction as well as two curved lands 74 in two of the corners of the cavities. In either embodiment, the inner diaphragm 14 rests on these lands.

Because the area of the top surface of the base 60 is much larger than the area of the top surface of the pillar 50, its flatness is no longer a concern and in making these bases the steps of machining and grinding are no longer necessary.

Several dozen prototypes were made and tested. This was done by mounting sensor glass capsule prototypes onto the bases using glass frit and testing them over the pressure range of 0–40 inches of mercury, and the temperature range of −54 to 107° C., with high accuracy results. High pressure proof tests were also performed on two prototypes in a metal assembly with an "O" ring seal. Both prototypes withstood 1000 psi pressure without failure/break.

Various modifications and alterations to the above-described preferred embodiment and examples will be apparent to those skilled in the art. Accordingly, these descriptions of the invention should be considered exemplary and not as limiting the scope and spirit of the invention as set forth in the following claims.

What is claimed is:

1. A capacitive pressure sensor capsule comprising:

a housing having a cover sealingly attached to a ceramic base to define an interior chamber, said housing further including an inlet port in fluid communication with a source of fluid pressure to be measured, and said chamber;

said base having a cavity facing said interior chamber and at least one hole adjacent to said cavity that extends through said base;

a glass sensor comprising a first diaphragm with a first electrode thereon and a second diaphragm with a second electrode thereon, said first and second diaphragms bonded together so that said first and second electrodes cooperate to form a capacitor, said first diaphragm having a first dimension greater than the corresponding dimension of said second diaphragm, said sensor disposed in said chamber and overlying said cavity so that second diaphragm is received in said cavity while the first diaphragm lies on the surface of said base and covers said hole; and at least one conducting member extending from said sensor and through said hole.

2. The capsule of claim 1 wherein said cover is ceramic.

3. The capsule of claim 1 wherein said cover is metal.

4. The capsule at claim 1 wherein said cover is a polymer.

5. The capsule of claim 1 wherein said cover and base are sealed together with an adhesive.

6. The capsule of claim 1 further comprising a land disposed in said cavity for supporting said second diaphragm.

7. The capsule of claim 6 wherein said land is curved and centrally located along one side of said cavity.

8. The capsule of claim 6 further comprising a second land located in at least one corner of said cavity.

9. The capsule of claim 6 wherein said land is rectangular.

10. The capsule of claim 1 wherein said cover and base are sealed together with glass frit.

11. The capsule of claim 1 wherein said diaphragms are of different thickness.

12. The capsule of claim 1 wherein said diaphragms are bonded together with frit, said frit spacing said first diaphragm from said second diaphragm.

13. The capsule of claim 12 wherein the spacing between the diaphragms is evacuated to a preselected pressure.

14. The capsule of claim 12 wherein said cavity is open to ambient.

15. The capsule of claim 1 further comprising a crossover tab connecting said first electrode to a lead.

16. The capsule of claim 1 further comprising a ground shield on each of said diaphragms.

* * * * *